United States Patent [19]

Antoszewski

[11] 4,101,107
[45] Jul. 18, 1978

[54] FOLDING WALL BRACKET

[75] Inventor: Alex Joseph Antoszewski, Michigan City, Ind.

[73] Assignee: Leigh Products, Inc., Coopersville, Mich.

[21] Appl. No.: 722,810

[22] Filed: Sep. 13, 1976

[51] Int. Cl.² ............................................. F16M 13/02
[52] U.S. Cl. .................. 248/218.4; 248/293; 248/294
[58] Field of Search ................ 248/218.4, 219.2, 293, 248/294, 302, 303, 304, 305, 240, 240.4

[56] References Cited
U.S. PATENT DOCUMENTS

| 387,922 | 8/1888 | Schooley | 248/293 |
| 2,778,588 | 1/1957 | Capocci | 248/302 |
| 3,153,526 | 10/1964 | Pawsey | 248/302 X |
| 3,500,483 | 3/1970 | Schohn | 248/294 X |

Primary Examiner—William H. Schultz
Attorney, Agent, or Firm—Price, Heneveld, Huizenga & Cooper

[57] ABSTRACT

A bracket includes an anchor plate for mounting on the front face of a narrow vertical member such as a stud and having a channel-like opening for pivotally supporting a hanger member. The support member has a pair of fingers spaced apart a distance greater than the width of the vertical member and connected by a cross member integral with the fingers and including an offset central section having a pair of vertical legs. The side legs of the central section are spaced apart less than the width of the vertical member. When the support member is in an extended, operational position, the side legs rest against the vertical front face of the vertical member to limit further downward pivotal movement of the support member under the influence of gravity. The support member pivots upward with respect to the bracket to a retracted storage position where the fingers are stowed adjacent the sides of the vertical member and the side legs limit further rearward movement. In both extended and retracted positions, gravity biasing the support member to remain stable in the absence of position action to displace it.

6 Claims, 4 Drawing Figures

U.S. Patent  July 18, 1978  4,101,107
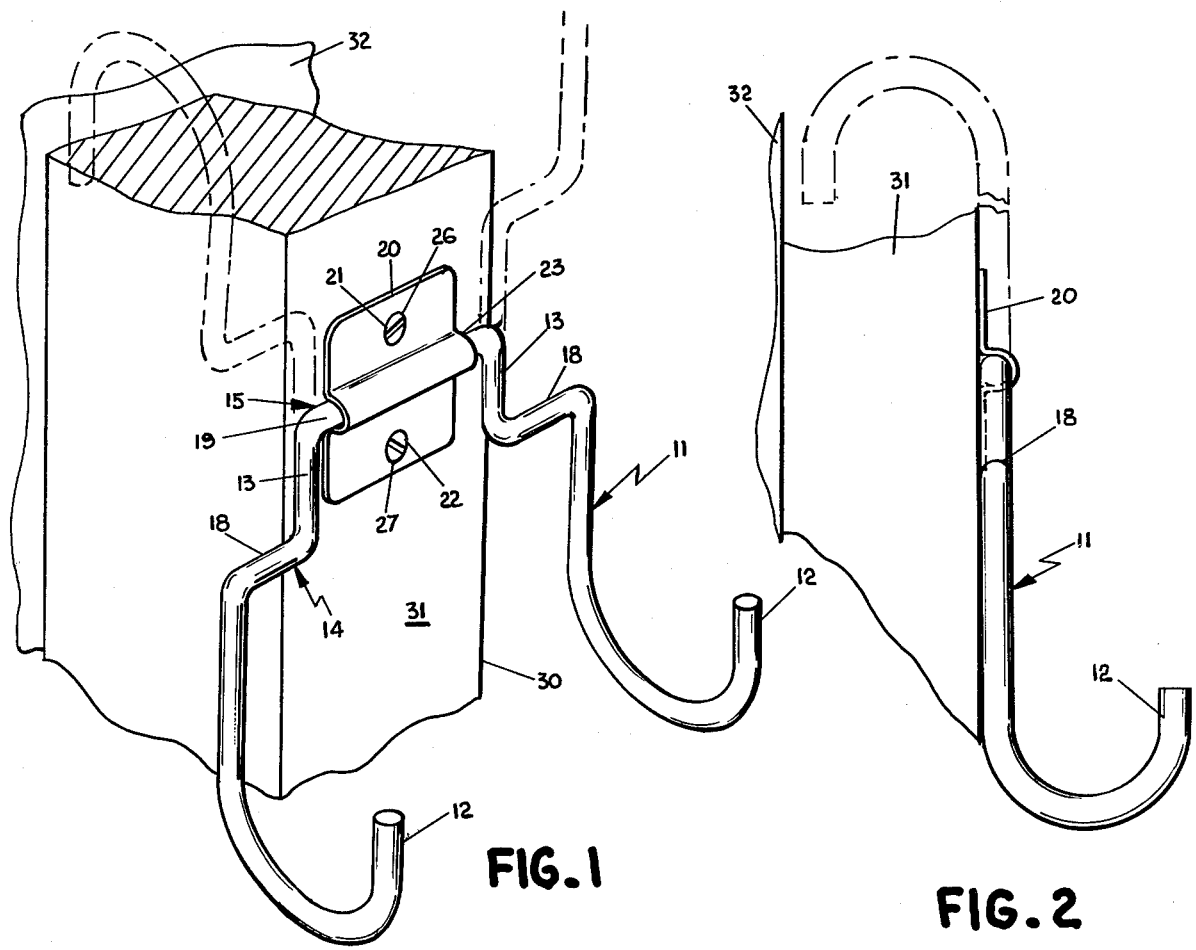
FIG. 1
FIG. 2
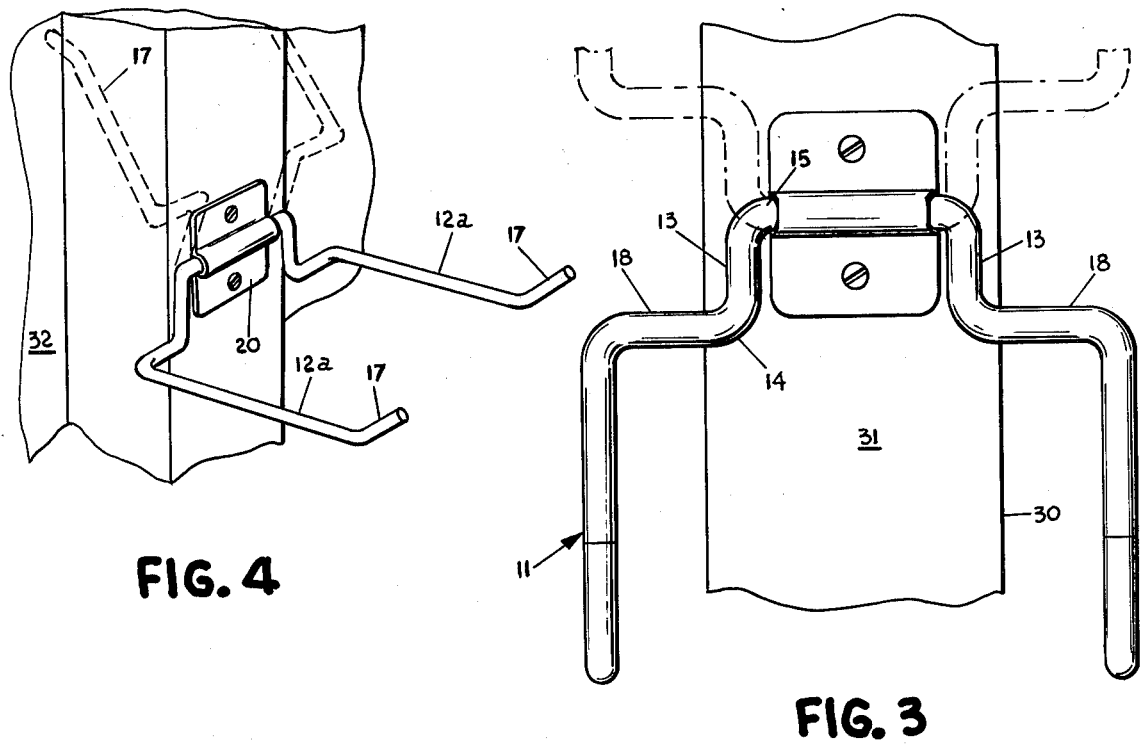
FIG. 4
FIG. 3

FOLDING WALL BRACKET

BACKGROUND OF THE INVENTION

1. Field Of The Invention

This invention relates to brackets and, in particular to brackets movable between a first, operational position and a second, storage position.

2. Prior Art

Prior art brackets, while providing a pivoted, gravity biased, article support member as disclosed in U.S. Pat. No. 3,484,069 issued Dec. 16, 1969 to Larson entitled ARTICLE SUPPORT CONSTRUCTION incorporate no means of retraction and storage for the support member or utilize a support member which detaches when moved to retracted position as shown in U.S. Pat. No. 3,153,526 issued Oct. 20, 1964 to Pawsey entitled HANGER BRACKET. In the case of this latter patent, separate storage must be provided for the detached bracket. Thus, the problem of storage is not effectively solved. Also, the detached bracket member can be lost between uses and must be installed when it is again desired to use it. These are among the deficiencies of existing brackets this invention overcomes.

SUMMARY OF THE INVENTION

This invention provides a bracket for mounting on the narrow face of a narrow, vertical support such as a wall stud, the bracket having a lowered operational position with fingers projecting outwardly from the support and a raised, storage position wherein the fingers are stowed adjacent the sides of the support. The bracket includes an article engaging arm or hanger member and an anchor plate having a forwardly offset mid-portion forming a rearwardly opening channel in the rear face of the anchor plate. The article engaging arm has a pair of fingers spaced apart a distance greater than the width of the support and an integral cross member interconnecting the fingers. The central section of the cross member is offset from the remaining two end portions of the cross member in an upward direction and connected to the two end portions by a pair of vertical side legs. The width of the offset portion is less than the width of the face of the support. The center of the offset portion is pivotally constrained within the channel in the anchor plate. In the lowered operational position the rearward face of the offset portion of the cross member contacts the front face of the support. In the storage position, the fingers are positioned above the anchor plate and extend rearwardly along the sides of the support member.

The bracket is particularly advantageous because only gravity is required to stabilize the hanger member in either its storage or operational positions. Further, the hanger member can be secured in a stored position both when the narrow vertical support member is free-standing or has a wall at its rear face. If there is no wall, the upward and rearward rotation of the hanger member is limited by engagement of the front face of the central section against the face of the vertical member. If there is a wall and the supporting fingers are sufficiently long, upward rotation of the hanger will be limited by finger contact with the wall.

BRIEF DESCRIPTION OF THE DRAWINGS

FIG. 1 is a frontal perspective view of a bracket in accordance with an embodiment of this invention, the storage position of the bracket being shown with phantom lines;

FIG. 2 is a side elevation view of the bracket shown in FIG. 1 against illustrating storage attitude in phantom;

FIG. 3 is a front elevational view of the bracket shown in FIG. 1; and

FIG. 4 is a frontal perspective view of a modified construction for the bracket.

DETAILED DESCRIPTION OF THE PREFERRED EMBODIMENT

Referring to FIG. 1, a bracket 10 mounted on the forward narrow face of a stud 30 includes an anchor plate 20 and a pivotally attached arm or hanger or, as also referred to herein, support member 11. Anchor plate 20 is formed of a generally rectangular, flattened piece of metal with a forwardly offset midportion forming a rearwardly opening channel 23 having a generally U-shaped cross section. Channel 23 has a longitudinal axis in the horizontal direction when anchor plate 20 is mounted on stud 30 and divides anchor plate 20 into an upper flange 37a and a lower flange 37b. A pair of openings 21 and 22 through anchor plate 20 are located, one on each side of channel 23, to accommodate screws 26 and 27, respectively, for securing anchor plate 20 to stud 30.

Support member 11 can be formed of a generally circular cross section wire to rod having a diameter slightly smaller than the diameter of channel 23 and bent to the configuration herein described. Referring to FIG. 3, support member 11 includes a cross member 14 extending between and integrally connecting two protruding fingers 12. Cross member 14 includes an offset central section 15 having a pair of vertical legs 13 joined by a hinge or pivot portion 19 and at their ends integral with the end portions 18 of cross member 14. Central section 15 is narrower than the stud 30. Accordingly, both legs 13 seat against the front face 31 of stud 30. Similarly, at least a portion of the length of end portions 18 is positioned against front face 31. Preferably, all portions of cross member 14 are in a single plane so rotational movement about the hinge portion 19 is limited by engagement of the cross member 14 with the front face 31 of stud 30. Further, the length of the cross member 14 is such that the fingers 12 are spaced a distance greater than the width of the stud.

In the embodiment illustrated in FIGS. 1–3, the fingers 12 have a generally semi-circular shape. FIG. 4 illustrates a similar support member 11a having a pair of generally straight fingers 12a equipped with upwardly inclined ends 17. It will be recognized that the shape of the fingers 12 will be governed in part by the intended use of the bracket and the particular shapes shown are illustrative only.

The construction of the bracket is particularly advantageous in providing a bracket which is gravity stabilized in both extended, operating position and retracted, storage position. More specifically, fingers 12 extend forwardly of front face 31 when cross member 14 is rotated forwardly and downwardly of channel 23. When fingers 12 are rotated upwardly, rotation continues until either the legs 13 of cross member 14 strike front face 31 or the ends of the fingers 12 rest against a wall 32 behind stud 30. Gravity holds supporting member 11 in either the extended, operational position or the retracted, stored position. Locating screw openings 21 and 22 on either side of channel 23 is advantageous for securing the anchor plate 20.

OPERATION

Mounting of bracket 10 is accomplished by placing support member 11 against stud 30, which can be, for example, a 2 × 4 with the central or pivot portion 19 in a horizontal position. Anchor plate 20 is positioned with the pivot portion 19 and channel 23 coaxial. Screws 26 and 27 are inserted through openings 21 and 23, respectively, mounting bracket 10 to the stud 30. Rotating supporting member 11 downward results in the legs 13 of cross member 14 engaging the front face 31. This is a stable position and support member 11 is biased into this position by gravity. When the fingers 12 extend from front face 31 into an article supporting operational position, the center of gravity of the support member is forward of and below the pivot portion 19.

If it is desired to shift the supporting member 11 to storage position, support member 11 is rotated upwardly and rearward until either cross member 14 engages the front face 31 or the end of fingers 12 (or 12a) engage wall 32. The center of gravity of support member 11 is then rearward of channel 23, biasing the support member rearwardly. Providing a stable storage position is particularly advantageous because it increases safety by permitting fingers 12, 12a to be retracted when they are not in use. This eliminates possible injury to materials and personnel.

The anchor plate is illustrated as providing a support member mounting channel which is open at the rear. This has the advantage of simplicity and economy. If will be recognized that other types of pivotal support could be provided for the support member including plates which have a channel closed at the rear.

Various other modifications and variations will no doubt occur to those skilled in the art to which this invention pertains. For example, the particular shape of the fingers may be varied from that disclosed herein. Further, the particular configuration or length of the legs may be varied from that disclosed herein. These and all other variations which basically rely on the teaching through which this disclosure has advanced the art are properly considered within the scope of this invention as defined by the appended claims.

The embodiments of the invention in which an exclusive property or privilege is claimed are defined as follows.

1. A bracket adapted to be mounted on the narrow face of a stud-like support, said bracket having a plate-like base piece adapted to seat against and be secured to the narrow face of said support, the improvement in said bracket comprising: a one-piece article engaging member having an arm, a base element extending from said arm, said base element having a first portion and a second portion generally normal to said first portion and when said member is in extended position extending generally parallel to the plane of the base piece and a third element extending from the end of the second element generally parallel to said first portion and joined to the arm, said first portion pivotally secured to said base piece, the second portion of the base element being adjacent the base piece and the base element being dimensioned to space the arm away from the base piece whereby if said base is dimensioned narrower than the face of the stud-like support and if said second portion of said base element is dimensioned to space the arm to one side of the stud-like support said second portion of said base element is adapted to rest against the face of the support when the member is in extended operating position and the arm will be above the base piece with the arm seated on one side of the support when the member is in retracted storage position, the center of gravity of the member in extended position biasing if forwardly and downwardly and the center of gravity of the member biasing it rearwardly when the member is in retracted position.

2. A bracket having a plate-like base piece, the improvement in said bracket comprising: a one-piece article engaging member having an arm and a base element having a first portion and a second portion extending normal to said first portion, and a third portion interconnecting said second portion and said arm and spacing said arm from said base piece, and means on said base piece pivotally securing said first portion to said base piece.

3. A bracket adapted for mounting on the forwardly offset vertical face of a laterally narrow support such as a building stud, said bracket having an article engaging arm and an anchor plate, said anchor plate having a forwardly offset midportion forming a channel in the rear face thereof flanked by a pair of ears occupying a common plane, the improvement in said bracket comprising: said arm having a pair of spaced fingers: a cross member having a central portion and remaining end portions integral with and interconnecting said fingers; a central portion of said cross member being offset from the remaining end portions thereof in an upward direction as said bracket is positioned for receiving a load; said offset central portion being seated in said channel and having a pair of side leg portions; whereby said arm is pivotal about said offset central portion from a lowered operating position with said fingers projecting outwardly from the support to a raised storage position wherein said fingers are seated adjacent the sides of the support; and whereby the legs of said cross member are adapted to be in the plane of said ears and to rest against the vertical forward face of the support in both positions to limit further pivotal movement under the influence of gravity.

4. A bracket as recited in claim 3 wherein said channel has a length less than the width of said offset central portion, and said legs are substantially perpendicular to said central portion and have a vertical orientation when said article engaging arm is in a lowered operating position.

5. In combination, a bracket and a narrow vertical member, said bracket adapted to be mounted to the face of said narrow vertical member, said bracket having an article support member integrally formed of a wire having a generally circular cross section, and an anchor plate having an elongated channel and a pair of generally flat flanges extending from opposite sides of said channel, said channel along its length opening toward the rear of said anchor plate and having all cross-sectional dimensions slightly larger than the cross-sectional dimensions of said article support member; said flanges each including an opening for passing mounting screws to secure said anchor plate; said support member having a pair of generally vertical arms integral with and joined by a cross member, said cross member being dimensioned to space said arms a greater distance than the width of the vertical member; said cross member having a central portion offset in a vertical direction when said support member is in an operating position, said central portion being dimensioned narrower than the face of the vertical member and wider than the length of said channel and being seated in said channel, and said cross member having a pair of vertical leg portions for connecting the extremities of said central portion to remaining end portions of said cross member; and said support member, at said central portion being pivotally connected to said anchor plate for pivotal movement between the operational position in which said arms extend forwardly out from the face of the vertical member and the rear face of said cross member is in the plane of said flanges and adapted to seat against the face of the vertical member below the pivotal connection and a storage position in which the forward face of said cross member is adapted to seat against the face of the vertical member above the pivotal connection and said arms project rearwardly adjacent the sides of the vertical member.

6. In combination, a bracket and a narrow faced stud-like support, said bracket adapted to be mounted on the narrow face of said stud-like support, said bracket having a base plate and an article supporting member, said base plate being mountable to said narrow face of the support, said member having a first portion pivotally mountable to said base plate and a second portion projecting therefrom to provide an article support, said first portion being dimensioned narrower than the support face and the second portion having a pair of article support elements and being dimensioned to space apart said elements wider than the support, said member being pivotable between an extended position with its center of gravity forward of and below the pivotal attachment of said first portion to said plate and a retracted position with its center of gravity rearward of and above the pivotal attachment of said first portion to said plate with said first portion being in the plane of the base plate and adapted to seat against the face of the support in both positions.

* * * * *

UNITED STATES PATENT AND TRADEMARK OFFICE
CERTIFICATE OF CORRECTION

PATENT NO. : 4,101,107
DATED : July 18, 1978
INVENTOR(S) : Alex Joseph Antoszewski It is certified that error appears in the above-identified patent and that said Letters Patent are hereby corrected as shown below:

Column 2, line 29:
"to rod" should be --or rod--

Column 3, line 32:
"If" should be --It--

Column 4, line 6:
"if" should be --it--

Column 4, line 26:
"fingers:" should be --fingers;--.

Signed and Sealed this

Twentieth Day of March 1979

[SEAL]

Attest:

RUTH C. MASON
Attesting Officer

DONALD W. BANNER
Commissioner of Patents and Trademarks